(12) United States Patent
Zhong (10) Patent No.: US 7,594,125 B2
(45) Date of Patent: Sep. 22, 2009

(54) POWER MANAGEMENT IN AN IEEE 802.11 IBSS USING AN END OF ATIM FRAME AND A DYNAMICALLY DETERMINED ATIM PERIOD

(75) Inventor: Zhun Zhong, Croton-On-Hudson, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 268 days.

(21) Appl. No.: 10/547,092

(22) PCT Filed: Feb. 23, 2004

(86) PCT No.: PCT/IB2004/000504

§ 371 (c)(1),
(2), (4) Date: Aug. 26, 2005

(87) PCT Pub. No.: WO2004/077763

PCT Pub. Date: Sep. 10, 2004

(65) Prior Publication Data

US 2006/0149980 A1 Jul. 6, 2006

Related U.S. Application Data

(60) Provisional application No. 60/451,031, filed on Feb. 27, 2003, provisional application No. 60/477,209, filed on Jun. 10, 2003.

(51) Int. Cl.
*G06F 1/00* (2006.01)
*G06F 1/26* (2006.01)
*G06F 1/32* (2006.01)
*G06F 15/16* (2006.01)

(52) U.S. Cl. ........................ 713/300; 713/320; 713/323; 709/230

(58) Field of Classification Search ................. 713/300, 713/320, 323
See application file for complete search history.

(56) References Cited

U.S. PATENT DOCUMENTS

| 5,386,435 | A * | 1/1995 | Cooper et al. ............... 375/134 |
| 6,192,230 | B1 * | 2/2001 | van Bokhorst et al. ... 455/343.3 |
| 6,694,149 | B1 * | 2/2004 | Ady et al. .................... 455/522 |
| 6,839,331 | B2 * | 1/2005 | Rudnick ..................... 370/312 |

FOREIGN PATENT DOCUMENTS

EP 0 907 262 A2 4/1999
WO WO 9911012 A1 * 3/1999

OTHER PUBLICATIONS

"An Energy Efficient MAC Protocol for Wireless LANs", by Eun-Sun Jung et al., pp. 1756-1764.

* cited by examiner

*Primary Examiner*—Thomas Lee
*Assistant Examiner*—Ji H Bae
(74) *Attorney, Agent, or Firm*—Larry Liberchuk (57) ABSTRACT

An apparatus and method is provided for power management in an Independent Basic Service Set (IBSS) Wireless Local Area Network (WLAN) that replaces the Ad-hoc Traffic Indication Message (ATIM) and its associated control logic, with a protocol comprising a variable length Data Alert frame transmission period or Data Alert window that accommodates the traffic in the IBSS and is followed by a data frame transmission period, a special End of Alert frame, a special LIFS for the End of Alert frame and new control logic. The End of Alert frame has a lower priority in a contention for a medium with a Data Alert frame, i.e., the Data Alert frame has the equivalent of a higher priority, thereby maximizing the number of Data Alerts sent during any Data Alert window. This approach to power management achieves optimal allocation of time used to send Data Alert frame and data frame thus minimizes power consumption by all wireless stations of the IBSS.

16 Claims, 6 Drawing Sheets

POWER MANAGEMENT IN AN IEEE 802.11 IBSS USING AN END OF ATIM FRAME AND A DYNAMICALLY DETERMINED ATIM PERIOD

CROSS REFERENCE TO RELATED APPLICATION

This application claims the benefit of U.S. Provisional Application Ser. No. 60/451,031 filed Feb. 27, 2003 and U.S. Provisional Application Ser. No. 60/477,209 filed Jun. 10, 2003 both of which are incorporated herein by reference.

The present invention relates to power management in a network comprising wireless stations (STAs), a wireless local area network (WLAN). More particularly, the present invention relates to power management in an Institute of Electrical and Electronics Engineers (IEEE 802.11) Independent Basic Service Set (IBSS). Most particularly, the present invention relates to improving the efficiency of the IEEE 802.11 IBSS power management scheme by introducing an End_of_ATIM frame and replacing the ATIM window with a dynamically determined ATIM period.

The wireless local area network (WLAN) is becoming more and more popular and is dominating technology in the WLAN market. This growth in popularity is due to the explosive growth in demand for portable wireless devices and communications networks to service these devices.

The WLAN supports two types of networks: the Infrastructure BSS and Independent BSS (IBSS). The basic service set (BSS) is the basic building block of a WLAN. Each BSS consists of at least two stations (STAs).

In the Infrastructure BSS, STAs communicate via a central access point (AP), which receives traffic from the source STA and relays it to the destination STA. In the Independent BSS or IBSS, also known as and Ad-hoc network, each STA 100 communicates with others directly 110, without the assistance of an AP, see FIG. 1. That is, each STA 100 in an Ad-hoc network can communicate with another STA if they are within radio range of one another. All communication between STAs 100 in an IBSS is peer-to-peer.

Figure 2:
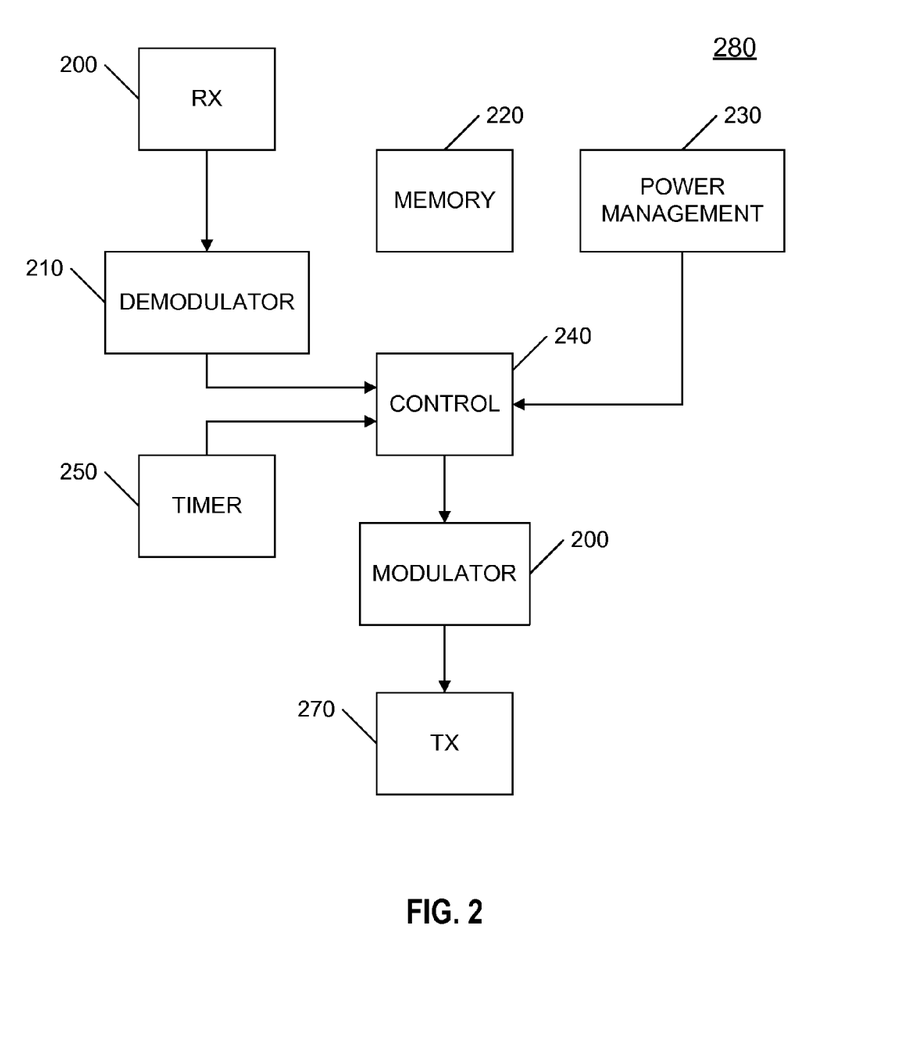
FIG. 2 illustrates a simplified block diagram of each STA within a particular IBSS according to an embodiment of the present invention.

Power saving in a WLAN is typically achieved by having STAs enter a lower power consumption mode—the sleep mode—whenever appropriate. By way of illustration only, and not limitation, FIG. 2 shows a control configuration 280 of a wireless STA 100 having a Power Management Circuit 230 for this purpose. Though power is saved in the sleep mode, the STAs in sleep mode are totally isolated from the rest of the network, i.e., they can neither transmit nor receive any packets. This raises a problem: when a STA has packets to transmit and the destination STA is in sleeping mode, namely, "How to wakeup the destination STA so that it can receive the packets?"

Figure 3:
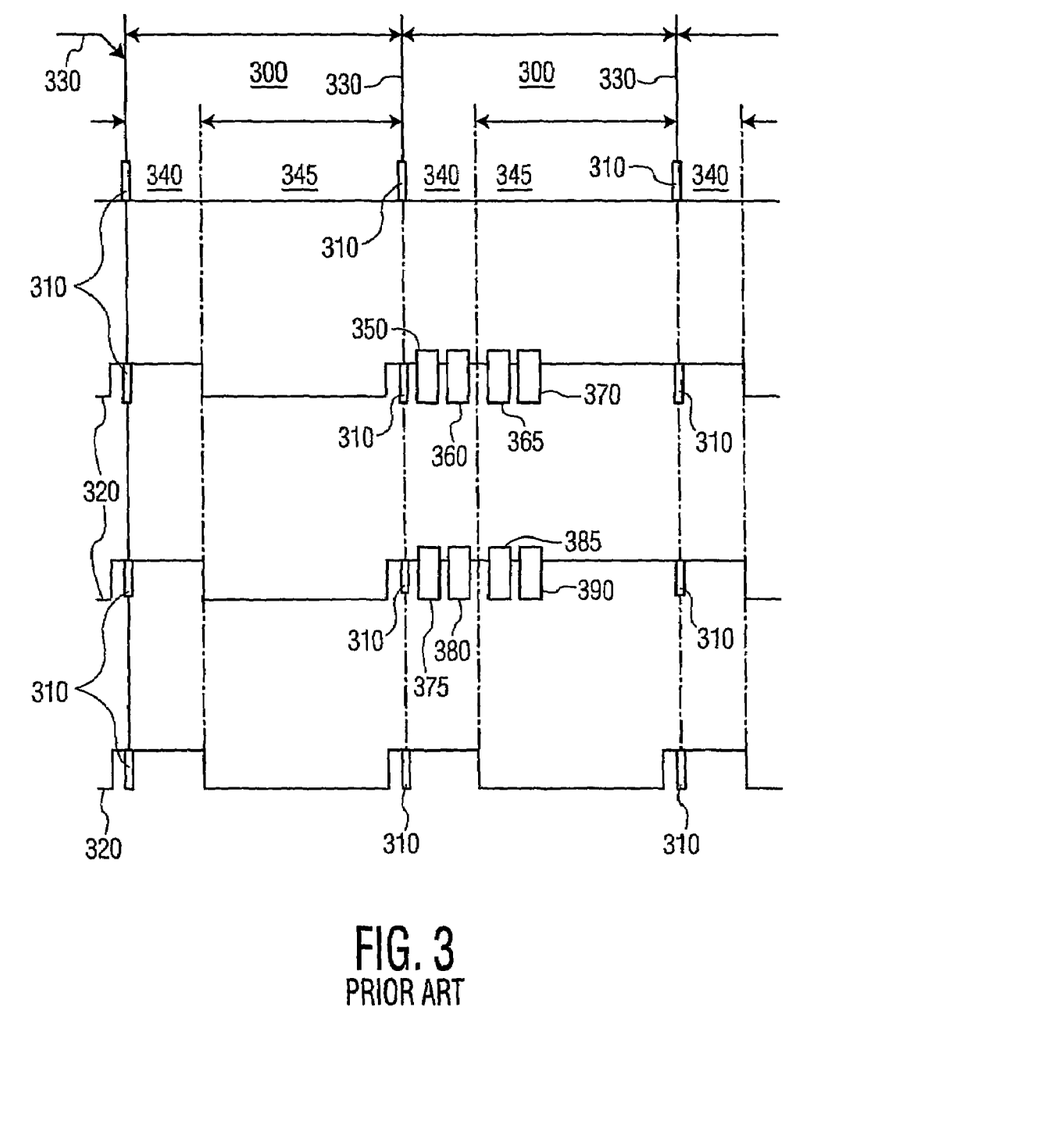
FIG. 3 illustrates power management operation in IEEE 802.11 IBSS.

To solve this problem, an IBSS WLAN uses a Data_Alert message and a Data_Window to perform power management for the IBSS. FIG. 3 illustrates the operation of an IEEE 802.11 IBSS WLAN wherein an Ad-hoc transmission/traffic indication message 350 or ATIM is such a Data_Alert message. At a predetermined interval, known as Target Beacon Transmission Time (TBTT) 330, all STAs in an IBSS wake up and compete to send their Beacon 310 out because Beacon generation in an IBSS WLAN is distributed. Each STA in the IBSS has a Beacon 310 ready to transmit at the TBTT 330 and competes with all other STAs in the IBSS to access the medium using a random delay. The STA that wins the contention effectively cancels all the other pending Beacon transmissions. Therefore, except for the case of Beacon failure, one Beacon is transmitted per Beacon Interval 300.

A window of a predetermined length, that occurs right after the Beacon 310 is transmitted, is reserved as a Data_Alert/ATIM window 340, in which only Data_Alert/ATIM frames 350 and their acknowledgements 360 can be transmitted. Data_Alert/ATIM frames 350 are traffic announcements, used by source STAs to inform destination STAs that there are data frames to be transmitted to them. Data_Alert/ATIM frames 350 that cannot be transmitted before the Data_Alert/ATIM window 340 expires are transmitted during the next Data_Alert/ATIM window 340 which follows the next TBTT 330.

After the Data_Alert/ATIM window 340 is over, if a STA doesn't successfully send or receive any Data_Alert/ATIM frames 350, the STA assumes that there will be no traffic for it during the current Beacon Interval 300 and, thus, it can go to sleep mode (low power mode) until the next TBTT 330. Otherwise, a STA can start transmission of data frames 365 and receipt of their acknowledgements 370 or stay in the receiving mode throughout the Beacon Interval 300 to receive a previously announced data frame 385 and transmit an acknowledgement 390. Note that only the data that is announced during the Data_Alert/ATIM window 340 can be transmitted in the remaining Beacon Interval 300 after the Data_Alert/ATIM window 340 ends. Current approaches to power management require the Data_Alert/ATIM window 340 size to be a fixed size throughout the lifespan of an IBSS.

Figure 4:
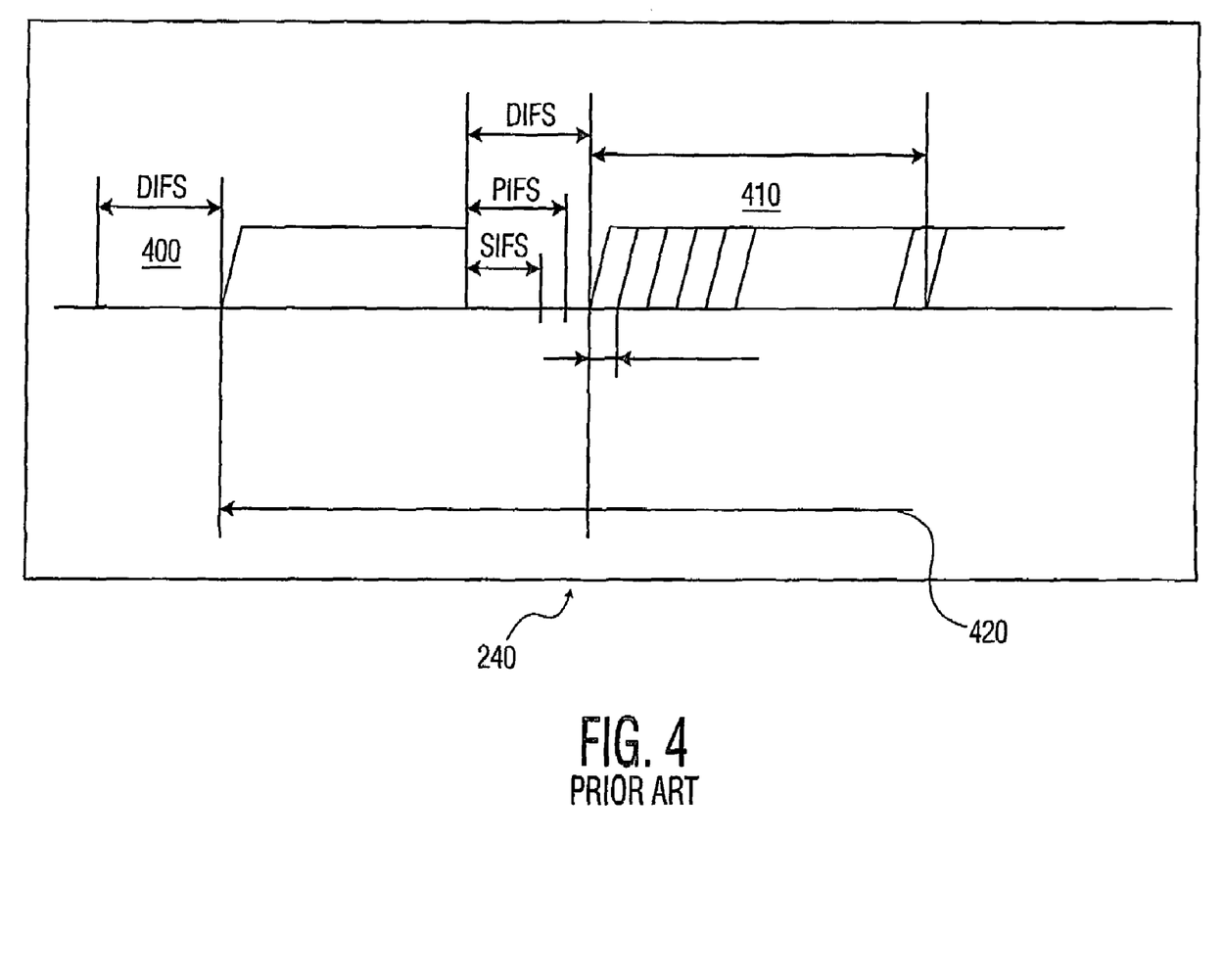
FIG. 4 illustrates the basic medium access method in IEEE 802.11 IBSS.

As illustrated in FIG. 4, a control component 240 of a STA, such as the control processor 240 of FIG. 2, is an exemplary implementation of a backoff procedure for medium access in an IBSS WLAN. A STA wanting to transmit a frame first senses the medium for a distributed coordination function (DCF) inter-frame space (DIFS) time period 400. If the medium remains idle during the DIFS period, the STA then picks a backoff interval in the range of [0,CW], where CW denotes a Contention Window size 410. For each time slot during which the medium remains idle, the STA decreases the backoff interval by one 420. The STA begins transmission when the backoff interval reaches 0.

In this prior art approach, choosing the length of the Data_Alert window is problematical. If the window is too small, all the Data_Alert frames cannot be transmitted during the Data_Alert window. As a result, some of the data frames that could have been transmitted in the current Beacon Interval have to wait until the next Beacon Interval and some of the bandwidth may be wasted. On the other hand, as the length of the Data_Alert window increases, the time left in the current Beacon Interval for data transmission decreases correspondingly. If the Data_Alert window is too large (more than enough to transmit all the Data_Alert announcements), the bandwidth may also be wasted since it may not be possible to use all the remaining bandwidth of the current Beacon Interval, to transmit buffered data frames.

Based on the foregoing discussion, an optimal Data_Alert window size depends on the number of STAs in the IBSS and the traffic load. That is, the greater the number of STAs (the heavier the network load), the larger the Data_Alert window must be to accommodate the maximum number of Data_Alert frames, and vice versa. This indicates that a fixed size Data Alert window cannot perform well in all situations, i.e., it is sub-optimal. Currently, IEEE 802.11 IBSS WLAN does not provide a mechanism to address this type of sub-optimality.

Accordingly, there is a need for an optimal way to make the period of time in which Data_Alert frames can be sent long enough so that a maximum number of waiting data frames can be sent in the remaining Beacon Interval. Some proposals have been made to change the Data-Alert window size adaptively in accordance with the observed network conditions. While arguably this may improve performance, it is still sub-optimal because this adaptation is based on historical data, e.g., the network condition during the last beacon interval and does not respond to actual network conditions as they occur, i.e., in the current beacon interval.

Figure 5:
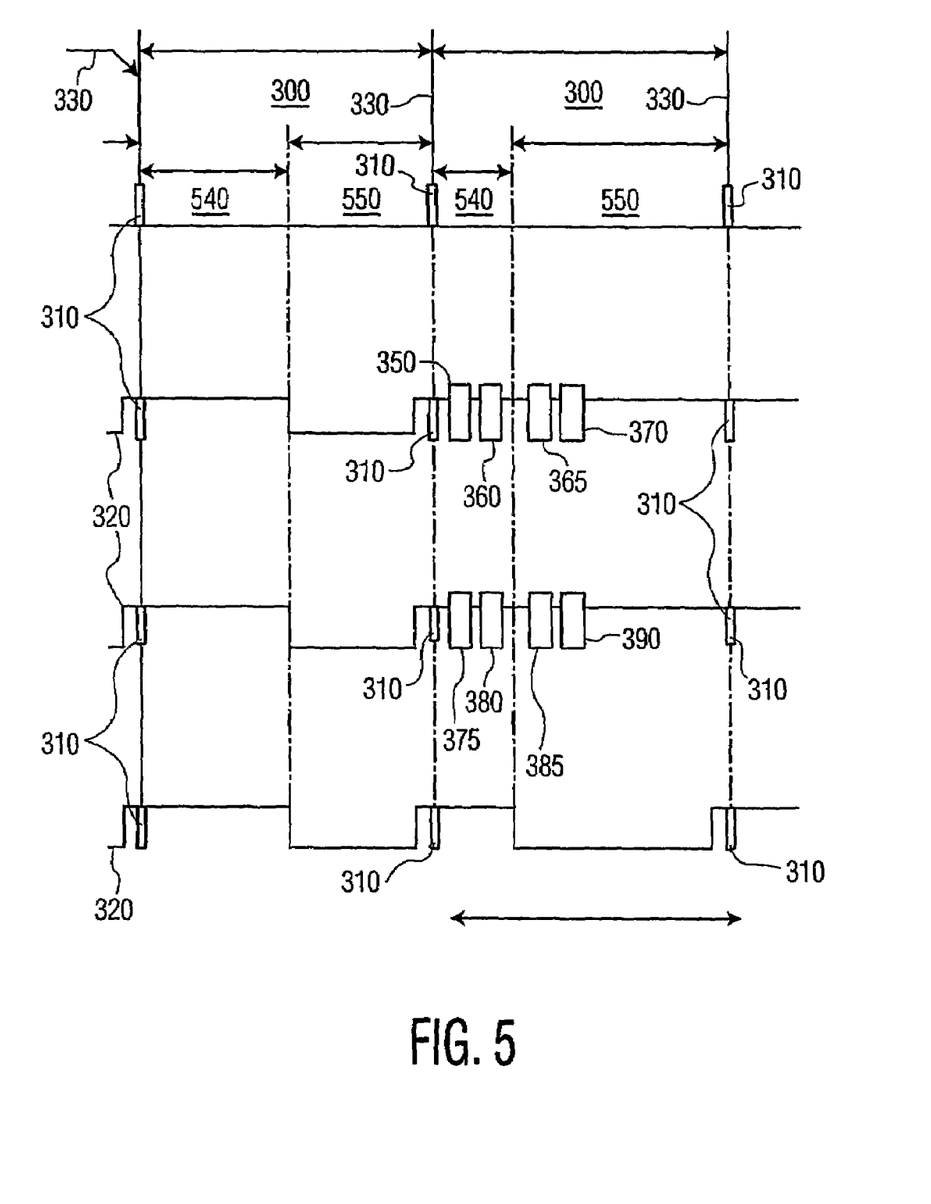
FIG. 5 illustrates power management operation by a STA using a variable Data_Alert period in an IBSS WLAN according to an embodiment of the present invention.

There are no known optimal Data_Alert window size adaptations for IBSS WLANs, and such an adaptation or its equivalent is needed. Referring now to FIG. 5, the present invention is directed to replacing the fixed-size Data_Alert window 340 of the prior art with a dynamically determined Data_Alert period 540 just following a TBTT during which there is a high probability that STAs of an IBSS WLAN send all their Data_Alert frames. Thus, no size determination for the Data_Alert window is necessary. Conceptually, there is still a Data_Alert window called a Data_Alert period, started at TBTT, and ended at the first transmitted End_of_Alert. Therefore, the difference is not the elimination of the Data_Alert window, at least conceptually, but the ending of the Data_Alert window. The present invention replaces the ending at a fixed time after TBTT. Now the ending is determined by the first transmitted End_of_Alert. The Data_Alert period 540 is long enough so that there is a high probability that STAs will transmit all the Data_Alert frames corresponding to message(s) waiting to be transmitted, i.e., buffered by a STA of the IBSS in memory 220, and there is minimal wasted bandwidth as opposed to the wasted bandwidth that frequently happens with the fixed window size of the prior art. And, power is conserved by this maximal use of bandwidth by the apparatus and method of the present invention.

Accordingly, the apparatus and method of providing a variable length Data_Alert period 540 for transmission of Data_Alert frames 350 and their acknowledgements 360 is an optimal or near-optimal solution to the problem of transmitting a Data_Alert frame 350 for buffered messages. It conserves bandwidth while minimizing power expended and retains the benefit of the prior art Data_Alert announcement (e.g., ATIM 350); eliminates the fixed Data_Alert window 34; and, provides enough time for a high probability of the transmission all the Data_Alert frames 350 by providing an End_of_Alert frame to be sent by each STA after the STA sends all its Data_Alert frames 350.

In a preferred embodiment, an interframe space longer than DIFS, i.e., a long inter-frame space or LIFS, is chosen for the End_of_Alert frame to give it lower priority to access the medium so that there is a high probability that all Data_Alert frames 350 are sent before any End_of_Alert frame can be transmitted. Other than using a longer interframe space, the approach doesn't involve any other changes in the backoff procedure for the End_of_Alert frame. This approach is optimal or nearly so, since such LIFS can be chosen that there is a high probability that all Data_Alert frames 350, corresponding to buffered data frames, are transmitted before any data frame.

The foregoing and other features and advantages of the present invention will be apparent from the following, more detailed description of preferred embodiments as illustrated in the accompanying drawings.

In the following description, by way of example and not limitation, specific details are set forth such as the particular architecture, techniques, etc., in order to provide a thorough understanding of the present invention. However, to one skilled in the art it will be apparent that the present invention may be practiced in other embodiments that depart from the specific details set forth herein.

Figure 1:
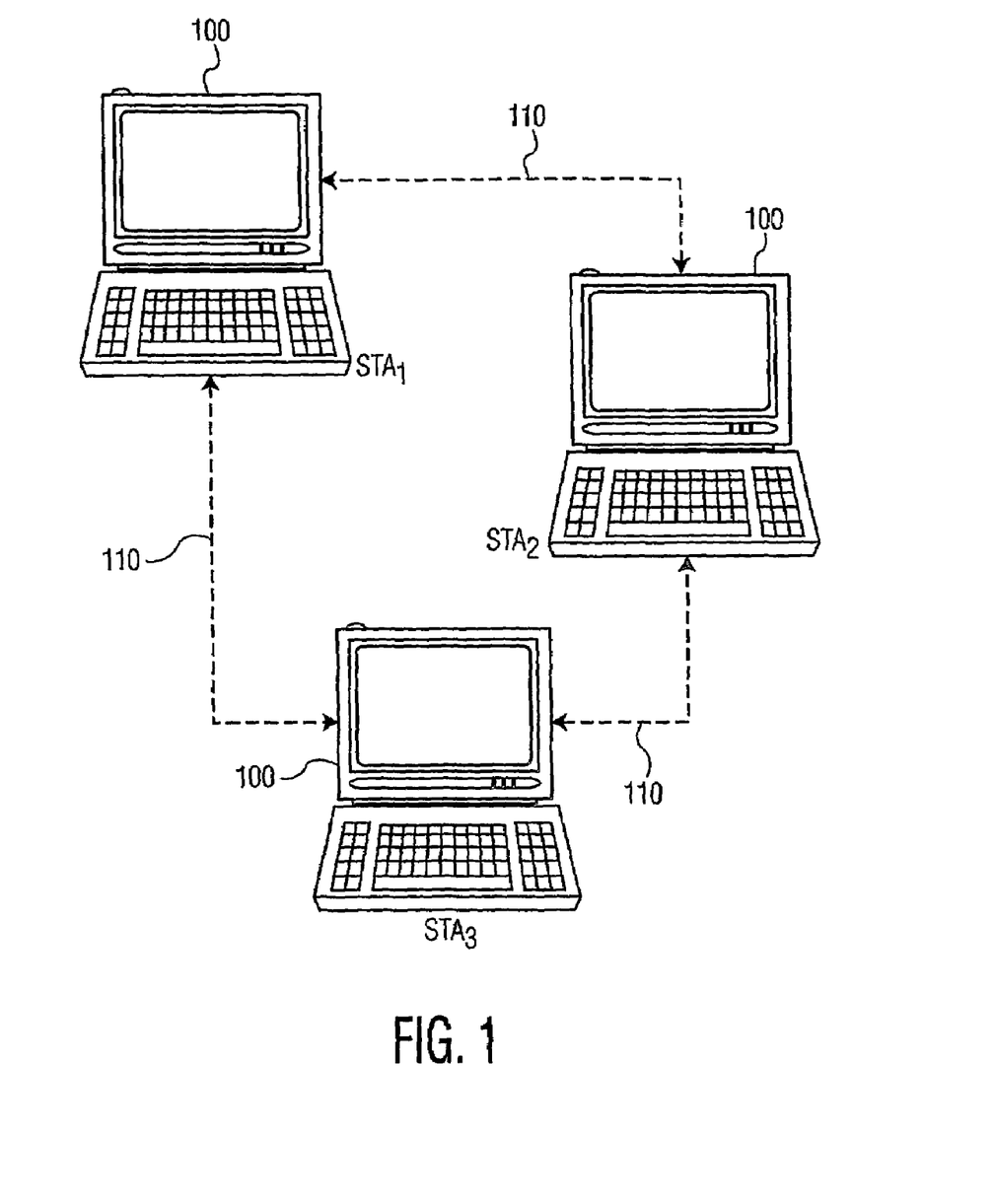
FIG. 1 is a simplified block diagram illustrating the architecture of a wireless communication system whereto embodiments of the present invention are to be applied.

FIG. 1 illustrates a representative network whereto embodiments of the present invention are to be applied. As illustrated in FIG. 1, a plurality of STAs 100 communicates through a wireless link with each other via a plurality of wireless channels 110 such that all traffic is peer-to-peer. A key principle of the present invention is to provide a mechanism to optimize power use by each wireless STA 100 such that within each Beacon Interval 300 the maximum number of data frames 365 are transmitted between the STAs 100 while at the same time a STA 100 stays awake only if it has frames to transmit and/or receive, going into a sleep or low power mode otherwise to conserve power. It should be noted that if the remaining time 550 in a Beacon Interval 300 is small, a STA 100 may not enter sleep mode since the power consumed to awake at the next TBTT 330 may exceed the power saved by going into sleep mode for so short a time. Further, It should be noted that the IBSS network shown in FIG. 1 is small for purposes of illustration. In practice most networks include a much larger number of mobile stations.

Referring to FIGS. 1 and 2, each STA 100 of an IBSS within the WLAN of FIG. 1 may include a system with an architecture that is illustrated in the block diagram of FIG. 2. Each STA 100 may include a receiver 200, a demodulator 210, a memory 220, a power management circuit 230, a control processor 240, a timer 250, a modulator 260, and a transmitter 270. The exemplary system 280 of FIG. 2 is for descriptive purposes only. Although the description may refer to terms commonly used in describing particular mobile STAs, the description and concepts equally apply to other processing systems, including systems having architectures dissimilar to that shown in FIG. 2.

In operation, the receiver 200 and the transmitter 270 are coupled to an antenna (not shown) to convert received signals and desired transmit data via the demodulator 210 and the modulator 260, respectively. The power management circuit 230 operates under the control of the processor 240 to determine whether the STA should remain awake throughout the remainder of a given Beacon Interval 300 or go to sleep (low power mode) by determining if the remaining time for the given Beacon Interval 300 is greater that a predetermined threshold. The computed remaining time in the Beacon Interval 300 is determined by subtracting the current time from the time of the next TBTT, the latter value being stored in the memory 230. The timer 250 is used to wake up a sleeping STA at predetermined TBTTs 330 and to schedule the control processor 240 to send a Beacon since at the TBTT all STAs compete to send their Beacons.

The IEEE 802.11 standard is defined in International Standard ISO/IEC 8802-111, "Information Technology—Telecommunication and Information Exchange Area Networks", 1999 Edition, which is hereby incorporated by reference in its entirety. According to this standard, the purpose of the IEEE 802.11 IBSS ATIM window 340 is to let every STA 100 of an IBSS know that after a certain point (the fixed length of the ATIM window) there will be no ATIM announcements so that the STA that receives no ATIM announcement can go back to sleep (low power consumption mode) right after the ATIM window 340 is over.

Referring now to FIG. 3, in general, the ATIM of the IEEE 802.11 IBSS WLAN is a Data_Alert window 340 of a known and fixed length so that during the Data_Alert/ATIM window 340 each STA 100 can alert another STA 100 of the IBSS that it has data for it, by sending that STA a Data_Alert/ATIM frame 350.

In a preferred embodiment, the present invention replaces the ATIM window 340 with a variable Data_Alert period 540, the ATIM protocol with a new Data_Alert protocol that uses a new End_of_Alert frame, to achieve the same goal as the ATIM window 340 using the same Data-Alert/ATIM frame 350. In the new Data_Alert protocol which applies to IBSS WLAN architectures, an implementor can change the probability (to as high as 100%) that all Data_Alert frames 350 are transmitted during the Data Alert period 540 before any corresponding data frames 365 are transmitted, by changing the interframe space used by the End_of_Alert frame.

In a preferred embodiment, the present invention achieves the goal of an ATIM window 340 but without the fixed ATIM window 340. Further, the present invention improves on the IEEE 802.11 IBSS WLAN by choosing a probability that, IBSS-wide, all Data_Alert frames 350 are transmitted before any data frames 465 are transmitted. The probability can be chosen so as to guarantee that all are sent.

The present invention is therefore an optimal or near-optimal solution to the problem of using all the available bandwidth to send a Data_Alert frame 350 for waiting, i.e., buffered in memory 220, data frames 365 before any of the corresponding data frames 365 are sent.

In a preferred embodiment, an interframe space longer than DIFS, i.e., a long interframe space or LIFS, is chosen for the End_of_Alert frame. If the LIFS is long enough then it is guaranteed that all the Data Alert frames 350 are sent by all the STAs 100 of the IBSS before any End_of_Alert frame is sent by a STA. If a shorter LIFS is chosen (but still larger than DIFS) it is not guaranteed that all Data_Alert frames 350 are sent before any End_of_Alert frame is sent. This still gives Data_Alert frames 350 higher (but not absolute) priority over End_of_Alert frames. The use of a shorter LIFS is effectively choosing a probability that all the Data Alert frames 100 are sent before any End_of_Alert frame is sent. Since the medium is idle (thus time is wasted) during LIFS, the shorter LIFS is preferable. On the other hand, the longer the LIFS the greater the number of Data_Alerts that can be sent before an End_of_Alert is sent.

In this embodiment, the End_of_Alert is a special frame that uses an interframe space LIFS, which is longer than DIFS, in a contention for the medium with a Data_Alert frame. The End_of_Alert frame uses the same DCF medium access procedure as illustrated in FIG. 4, except that it uses LIFS instead of DIFS.

Figure 6:
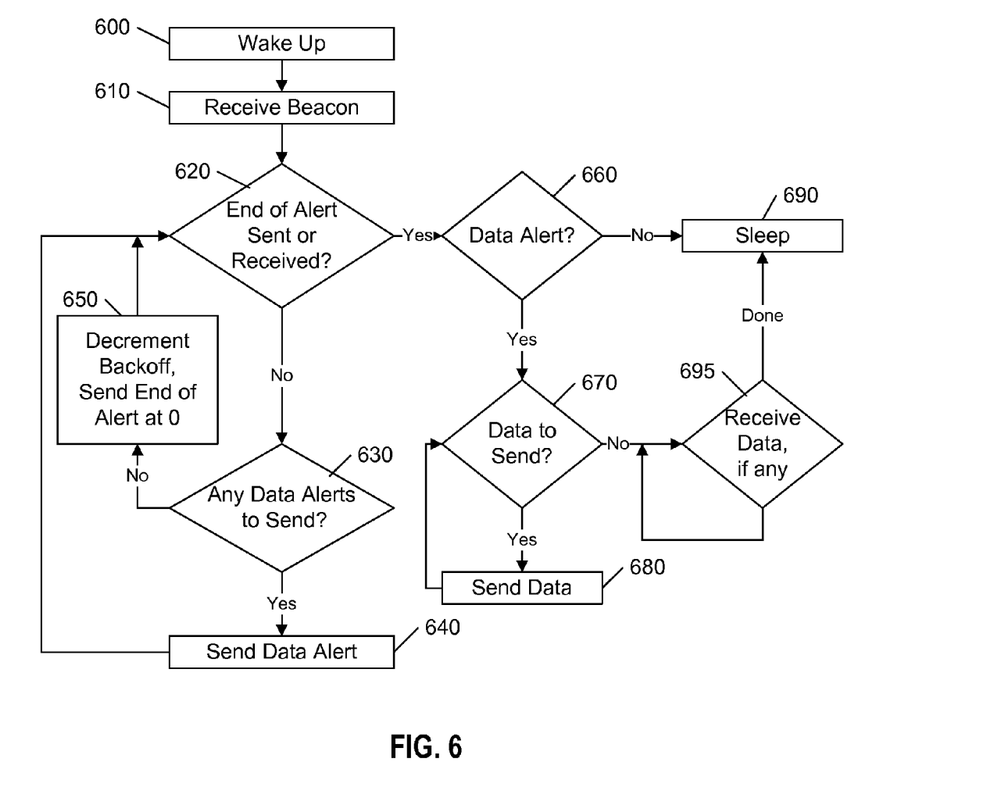
FIG. 6 illustrates a flow diagram of a process of managing power by a STA according to an embodiment using the LIFS of the present invention.

The operation of the Data_Alert period of the present invention is illustrated in the flow diagram of FIG. 6, and may be carried out by an embodiment of this operation that is applied to the system architecture 280 of each STA of an IBSS WLAN.

A preferred embodiment, illustrated in FIG. 6, comprises the following steps:

STA Wakes Up at Target Beacon Time (Steps 600-610 of FIG. 6)

At step 600 all sleeping STAs 100 wake up at the start of the Beacon Interval 300. Each STA 100 in the IBSS has a Beacon ready to transmit at the TBTT 330 and competes with all other STAs 100 in the IBSS to access the medium using a random delay. The STA 100 that wins the contention effectively cancels all the other pending Beacon transmissions. Therefore, except for the case of Beacon failure, one Beacon is transmitted/received at step 610 after the TBTT 330 per Beacon Interval 300.

Source STA Sends as Many Data Alert Messages as Possible for Waiting Packets to the Corresponding Destination STAs (Steps 620-650 of FIG. 6)

In a preferred embodiment, each source STA keeps a list of packets (data frames 365) waiting to be transmitted to a destination STA (e.g., packets or data frames buffered in memory 220) and attempts to send a Data_Alert frame 350 to the appropriate destination STA 100. At step 620, a source STA 100 determines if it has received or sent any data frame 365 or End_of_Alert frame and if not determines at step 630 if there is any Data_Alert to be sent to a destination STA.

If the STA has buffered packets then at step 640 the STA send a Data_Alert for one of these buffered packets to the appropriate destination STA and repeats step 620.

If the STA has no buffered packets in its memory 220 then the STA tries to broadcast and End_of_Alert frame at step 650 using the LIFS and then repeats step 620

This process of steps 620-650 is repeated until either the STA has successfully sent/received an End_of_Alert frame or received a data frame indicating that at least one STA of the IBSS WLAN, including this one, has finished sending all its pending Data_Alerts.

In the present invention all STAs 100 of the IBSS remain awake during the Data_Alert period 540, i.e., until at least one STA of the IBSS WLAN has sent all its Data_Alert frames 350, so that if any source STA has a message for a destination STA, most of the destination STAs receives a Data_Alert frame 350 to that effect, depending on the size of LIFS.

When a STA is successful in sending an End_of_Alert frame at step 620, other STA 100 in the IBSS may still have an outstanding Data_Alert frame 350 to send. In a preferred embodiment, the size of LIFS in the End_of_Alert backoff procedure determines if all or almost all Data_Alerts of the IBSS are sent.

STA Determines if it has Received or Sent Any Data Alert Frames (Step 660 of FIG. 6)

In a preferred embodiment, at step 660 the STA 100 checks to see if it should remain awake either to receive or send one or more data frames 365. If the STA sent a Data_Alert frame 350 at step 640, the STA must remain awake to send the corresponding data frame 365. If the STA received a Data_Alert frame 350 from a source STA (not shown in FIG. 6) the STA must also remain awake until receipt of the corresponding data frame 365.

If the STA has not sent or received any Data_Alert frames 350 then no data frames 365 can be sent during the Beacon Interval 300 to the STA nor can the STA 100 send any data frames 365 to destination STAs because they were not announced since the most recent TBTT 330. So the STA can go to sleep (low power mode) at step 690.

STA Sends/Receives Any Data Frame Announced by a Data_Alert Frame Since the Most Recent TBTT (Steps 670, 680 and 695 of FIG. 6)

In a preferred embodiment, at step 670 the STA first checks to see if it has any data frames to send to a destination STA and if so, at step 680 sends any data frames 365 corresponding to Data_Alert frames 350 sent by the STA to a destination STA since the most recent TBTT 330. Then, at step 695, the STA 100 receives all data frames 365 corresponding to each of the Data_Alert frames 350 the STA received since the most recent TBTT 330. Then, since the STA has no more data frames 365 to send and does not expect to receive any more data frames 365, the STA goes to sleep at step 690.

As is apparent from the foregoing, by eliminating the fixed Data_Alert window 340 the present invention has an advantage in that the amount of time allocated to sending Data_Alert frames 350 is dynamically adjusted during each Beacon Interval by each STA to achieve a near optimal or optimal solution to the problem of how to minimize power used while maximizing the number of data frames 365 sent during a Beacon Interval 300.

In a preferred embodiment, an existing control component 230 of a STA is preferably modified with additional circuitry/control logic to accomplish the apparatus and method of the present invention, e.g., by the addition of an application-specific integrated circuit (ASIC), in order to accomplish the steps of FIG. 6.

In a preferred embodiment for the IEEE 802.11 IBSS WLAN, the apparatus and method of the present invention replace the ATIM window such that this fixed window is effectively replaced by a time-period that is dynamically adjusted to allow a maximum number of ATIMs to be sent by STAs of the IBSS by giving priority to ATIMs in any contention with a special End_of_ATIM frame and using a LIFS as described above for the End_of_ATIM frame.

While the present invention has been described in connection with what is presently considered to be the best mode for managing power in an IBSS WLAN by sending a maximum number of Data_Alert frames by all STAs of the IBSS followed by sending a special End_of_Alert frame in conjunction with a special interframe space for contention for the medium with Data_Alert frames, it is to be understood that the invention is not limited to the disclosed embodiment, but on the contrary is intended to cover various modifications and equivalent arrangements included within the spirit and scope of the appended claims.

The invention claimed is:

1. A method for power management in a first wireless station of a network that includes a plurality of stations, the method comprising:
    sending one or more Data_Alert frames, each corresponding to a data frame buffered by the first wireless station that is to be sent to a destination station of the plurality of stations;
    transmitting an End-of-Alert frame when the first wireless station has no more Data_Alert frames to send; and
    if the End-of-Alert frame is successfully transmitted by the first wireless station, or an End-of-Alert or a data frame transmitted by a second station of the plurality of stations is detected by the first wireless station:
        sending by the first wireless station any data frame to be sent,
        receiving by the first wireless station any data frame to be received, and
        entering a low power mode in the first wireless station if no data frame is to be sent or received.

2. The method of claim 1, wherein the network conforms to a modified IEEE 802.11 Independent Basic Service Set WLAN protocol.

3. The method of claim 2, wherein the modified protocol includes the transmitting of the End-of-Alert frame in lieu of maintaining a fixed-duration Ad-hoc Traffic Indication Message window.

4. The method of claim 1, wherein the transmitting of the End-of-Alert frame includes using a long inter-frame space in a backoff procedure to reduce contention with other transmissions that use a distributed coordination function inter-frame space, wherein the long inter-frame space is greater than the distributed coordination function inter-frame space.

5. The method of claim 4, including:
    waking up from the low power mode at a predetermined and periodic Target Beacon Transmission Time;
    competing with other stations of the plurality of stations to send a Beacon,
    wherein, only one station of the plurality of stations sends the Beacon.

6. The method of claim 5, wherein the network conforms to a modified IEEE 802.11 Independent Basic Service Set Wireless Local Area Network protocol.

7. The method of claim 6, wherein the modified protocol includes the transmitting of the End-of_Alert frame in lieu of maintaining a fixed-duration Ad-hoc Traffic Indication Message window.

8. The method of claim 1, including:
    waking up from the low power mode at a predetermined and periodic Target Beacon Transmission Time;
    competing with other stations of said plurality of stations to send a Beacon,
    wherein, only one station of the plurality of stations sends the Beacon.

9. The method of claim 8, wherein the network conforms to a modified IEEE 802.11 Independent Basic Service Set Wireless Local Area Network protocol.

10. The method of claim 9, wherein the modified protocol includes the transmitting of the End-of_Alert frame in lieu of maintaining a fixed-duration Ad-hoc Traffic Indication Message window.

11. An apparatus for power management in a first wireless station of a network that includes a plurality of stations, comprising:
    a control component that includes control logic configured to:
        send a Data_Alert to each Destination station for which at least one packet is buffered by the first wireless station;
        send an End-of-Alert frame; and
        if the End-of-Alert frame is successfully transmitted, or an End-of-Alert or a data frame transmitted by second station of the plurality of stations is detected:
            send and receive all data frames, if any, and
            put the first wireless station into a power saving mode.

12. The apparatus of claim 11, wherein the network conforms to a modified IEEE 802.11 Independent Basic Service Set Wireless Local Area Network protocol that includes an Ad-hoc Traffic Indication Message window, wherein receipt of the End_of Alert frame serves to terminate the Ad-hoc Traffic Indication Message window.

13. The apparatus of claim 11, wherein the controller is configured to use a long inter-frame space to reduce contention between transmission of the End-of-Alert frame and a transmission sent by another station using a distributed coordination function inter-frame space, wherein the long inter-frame space is longer than the distributed coordination function inter-frame space.

14. The apparatus of claim 11, wherein the control component is configured to periodically wake up at a predetermined Target Beacon Transmission Time and compete to send a Beacon.

15. The apparatus of claim 12, wherein the control component is configured to periodically wake up at a predetermined Target Beacon Transmission Time and compete to send a Beacon.

16. The apparatus of claim 13, wherein the control component is configured to periodically wake up at a predetermined Target Beacon Transmission Time and compete to send a Beacon.

* * * * *